(12) United States Patent
Inada et al.

(10) Patent No.: US 7,622,001 B2
(45) Date of Patent: Nov. 24, 2009

(54) ROBOT

(75) Inventors: Takahiro Inada, Kakogawa (JP);
Toshiyuki Tsujimori, Kakogawa (JP);
Shinji Kitamura, Akashi (JP); Ryou Taniuchi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 584 days.

(21) Appl. No.: 11/227,129

(22) Filed: Sep. 16, 2005

(65) Prior Publication Data

US 2006/0102072 A1 May 18, 2006

(30) Foreign Application Priority Data

Sep. 28, 2004 (JP) .............................. 2004-281941

(51) Int. Cl.
*B05B 3/00* (2006.01)
(52) U.S. Cl. ..................... 118/323; 901/43; 239/587.1; 239/587.5; 118/300
(58) Field of Classification Search ................. 239/112, 239/587.1–587.5; 901/15, 43; 118/323, 118/300, 324; 414/680
See application file for complete search history.

(56) References Cited

U.S. PATENT DOCUMENTS

| | | | | |
|---|---|---|---|---|
| 4,273,506 A | * | 6/1981 | Thomson et al. ............. | 414/735 |
| 4,282,627 A | * | 8/1981 | Downing ................ | 174/153 G |
| 4,300,198 A | * | 11/1981 | Davini ........................ | 700/264 |
| 4,532,148 A | * | 7/1985 | Vecellio ...................... | 427/480 |
| 4,630,567 A | * | 12/1986 | Bambousek et al. ........ | 118/323 |
| 4,679,734 A | * | 7/1987 | Mommsen et al. .......... | 239/692 |
| 4,690,010 A | * | 9/1987 | Matsumoto et al. .......... | 74/469 |
| 4,702,666 A | * | 10/1987 | Iwao et al. .................. | 414/730 |
| 4,703,668 A | * | 11/1987 | Peter ....................... | 74/490.06 |
| 4,721,630 A | * | 1/1988 | Takeo et al. ................. | 427/236 |
| 4,785,760 A | * | 11/1988 | Tholome ..................... | 118/323 |
| 4,854,808 A | * | 8/1989 | Bisiach ........................ | 414/680 |
| 4,864,888 A | * | 9/1989 | Iwata ........................... | 74/640 |
| 4,904,148 A | * | 2/1990 | Larsson ...................... | 414/680 |
| 4,973,215 A | * | 11/1990 | Karlen et al. ................ | 414/729 |
| 4,984,745 A | * | 1/1991 | Akeel et al. ............... | 239/587.2 |
| 5,098,024 A | * | 3/1992 | MacIntyre et al. ........ | 239/587.1 |

(Continued)

FOREIGN PATENT DOCUMENTS

EP 1 129 828 A1 5/2001

(Continued)

*Primary Examiner*—Dinh Q Nguyen
(74) *Attorney, Agent, or Firm*—Oliff & Berridge, PLC

(57) ABSTRACT

A robot includes a body structure on which a robot arm having an end effector is rotatably supported. The body structure has a stationary base unit fixedly installed and a movable unit rotatably supported on the stationary base unit to turn about an axis of rotation. The stationary base unit includes a stationary-side guide part having a stationary-side internal space in which a flexible, elongate member connected to the robot arm or the end effector is extended loosely along the axis of rotation. The stationary-side guide part opens upstream in an elongate member inserting direction. The movable unit includes a movable-side guide part having a movable-side internal space in which the elongate member is extended loosely along the axis of rotation. The movable-side guide part opens downstream in an elongate member inserting direction. The stationary-side and the movable-side internal spaces communicate with each other.

9 Claims, 14 Drawing Sheets

U.S. PATENT DOCUMENTS

| | | | | |
|---|---|---|---|---|
| 5,127,363 | A * | 7/1992 | Nakamura et al. | 118/695 |
| 5,454,533 | A * | 10/1995 | Grant et al. | 244/134 R |
| 5,645,884 | A * | 7/1997 | Harlow et al. | 427/8 |
| 5,833,147 | A * | 11/1998 | Fuhlbrigge | 239/587.5 |
| 5,887,800 | A * | 3/1999 | McClosky | 239/587.1 |
| 5,949,209 | A * | 9/1999 | Okamoto et al. | 318/563 |
| 5,964,407 | A * | 10/1999 | Sandkleiva | 239/112 |
| 5,983,744 | A * | 11/1999 | Watanabe et al. | 74/490.02 |
| 6,234,405 | B1 * | 5/2001 | Yoshida et al. | 239/112 |
| 6,477,913 | B1 * | 11/2002 | Akeel et al. | 74/490.03 |
| 6,554,212 | B2 * | 4/2003 | Borcea et al. | 239/391 |
| 6,804,579 | B1 * | 10/2004 | Laski | 700/245 |
| 6,835,248 | B1 * | 12/2004 | Haas et al. | 118/323 |
| 6,945,483 | B2 * | 9/2005 | Clifford et al. | 239/690.1 |
| 7,399,363 | B2 * | 7/2008 | Clifford et al. | 118/323 |
| 7,429,298 | B2 * | 9/2008 | Krogedal et al. | 118/323 |
| 2002/0040678 | A1 * | 4/2002 | Franzoni et al. | 118/314 |
| 2002/0046698 | A1 * | 4/2002 | Congard et al. | 118/323 |
| 2002/0046699 | A1 * | 4/2002 | Congard et al. | 118/323 |
| 2004/0047995 | A1 * | 3/2004 | Krueger | 427/346 |

FOREIGN PATENT DOCUMENTS

| | | |
|---|---|---|
| JP | A-3-136788 | 6/1991 |
| JP | A-5-57664 | 3/1993 |
| JP | A-6-114786 | 4/1994 |
| JP | A-6-143186 | 5/1994 |
| JP | A 07-108485 | 4/1995 |
| JP | A-7-108485 | 4/1995 |
| JP | A-7-124886 | 5/1995 |
| JP | A-8-15581 | 6/1996 |
| JP | A-9-141590 | 6/1997 |

* cited by examiner

ROBOT

CROSS REFERENCE TO RELATED APPLICATIONS

This application is based upon the prior Japanese Patent Application No. 2004-281941 filed on Sep. 28, 2004, the entire contents of which are incorporated herein by reference.

BACKGROUND OF THE INVENTION

1. Field of the Invention

The present invention relates to an industrial robot and, more particularly, to a painting robot.

2. Description of the Related Art

An industrial robot mentioned in JP-A 7-108485 includes a body structure which has a stationary base unit as a stationary part thereof and a robot swivel unit as a movable part thereof. The robot swivel unit is supported on the stationary base unit for turning about an axis of rotation relative to the stationary base unit. Through holes are formed through the stationary base unit and the swivel unit coaxially with the axis of rotation. Cables and such, namely, elongate members, connected to a robot arm are extended through the through holes. An opening is formed in a part of the stationary base unit apart from the axis of rotation. The cables and such are extended outside through the opening which is apart from the axis of rotation.

The cables and such extended outside through the opening apart from the axis of rotation need to be bent in the stationary base unit. Therefore, the cables and such are inevitably twisted around and displaced greatly relative to the axis of rotation when the swivel unit turns relative to the stationary base unit. Therefore, the cables and such are bent and twisted and are liable to rub against the stationary base unit. Consequently, the cables and such are abraded, damaged and broken. Thus, unnecessary force acts on the cables and such so that the cables and such are abraded, damaged and broken when the swivel unit turns relative to the stationary base unit.

SUMMARY OF THE INVENTION

Accordingly, it is an object of the present invention to provide a robot including a body structure having a stationary base unit and a movable unit, and a robot arm, which permits an arrangement of elongate members connected to the robot arm so that unnecessary force does not act on the elongate members and the elongate members are not abraded, damaged and broken when the movable unit turns relative to the stationary base unit.

The present invention provides a robot for carrying out a predetermined work, comprising: a body structure; a robot arm rotatably supported on the body structure, the robot arm having a front end part; and an end effector supported on the front end part of the robot arm, wherein the body structure has a stationary base unit fixedly installed at a predetermined position and a movable unit rotatably supported on the stationary base unit so as to turn about an axis of rotation relative to the stationary base unit, wherein the stationary base unit includes a stationary-side guide part having a stationary-side internal space in which a flexible, elongate member connected to the robot arm or the end effector is extended loosely along the axis of rotation, the stationary-side guide part opening upstream in a direction in which the elongate member is inserted into the stationary base unit, wherein the movable unit includes a movable-side guide part having a movable-side internal space in which the elongate member is extended loosely along the axis of rotation, the movable-side guide part opening downstream in a direction in which the elongate member is inserted into the movable unit, and wherein the stationary-side internal space and the movable-side internal space communicate with each other.

Preferably, the stationary base unit is fixedly mounted on a base having a substantially horizontal mounting surface on which the stationary base unit is placed.

Preferably, the robot further comprises rotative driving means for driving the movable unit so as to turn about the axis of rotation relative to the stationary base unit, the rotative driving means being fixedly mounted on the stationary base unit.

Preferably, the body structure is provided with a cylindrical auxiliary guide member fixed to the movable unit so as to extend into the stationary-side internal space of the stationary base unit, the auxiliary guide member defining an auxiliary internal space through which the elongate member is extended loosely along the axis of rotation, the auxiliary internal space communicating with the movable-side internal space of the movable unit.

Preferably, the body structure is provided with a contact member disposed at an upstream opening of the stationary-side guide part, the contact member having an inner peripheral part protruding radially inward beyond an edge of the upstream opening of the auxiliary guide member so as to contact with the elongate member.

Preferably, the contact member has an annular shape extending along the upstream opening of the stationary-side guide part.

Preferably, the end effector is a spray gun, the elongate member including a paint supply hose for supplying paint to the spray gun, and the predetermined work being a painting work for painting a workpiece.

According to the present invention, the elongate member connected to the robot arm is extended loosely through the stationary-side and the movable-side internal spaces substantially linearly along the axis of rotation. Therefore, the displacement of the elongate member in the stationary-side and the movable-side internal spaces around the axis of rotation can be suppressed when the movable unit is turned relative to the stationary base unit. Thus the rubbing of the elongate member against the stationary-side and the movable-side guide parts can be suppressed. Consequently, the damaging and breakage of the elongate member due to abrasion can be avoided.

Moreover, in the present invention, the elongate member is extended loosely through the stationary-side and the movable-side internal spaces substantially linearly along the axis of rotation, the stationary-side guide part opens upstream in the direction in which the elongate member is extended into the stationary base unit in the axis of rotation, and the movable-side guide part opens downstream in the direction in which the elongate member is extended outside from the movable unit in the axis of rotation. Therefore, the bending of the elongate member in the vicinity of the stationary base unit and the movable unit can be limited to the least possible extent. Thus the exertion of unnecessary force on the elongate members can be avoided.

When a plurality of elongate members are disposed, if curved elongate members are twisted, the elongate members are liable to interfere with each other, undesired force acts on the elongate members and the elongate members are progressively abraded. Since the bending of the elongate members can be limited to the least possible extent in the present invention, the elongate members will not interfere heavily with each other and the rubbing of the elongate members against each other can be suppressed. Thus the damaging and breakage of the elongate members due to abrasion can be prevented.

The elongate member can be extended without being excessively bent to be strained in the stationary-side and the movable-side internal spaces. Thus the installation operation of the elongate member can be facilitated.

Since the stationary base unit is mounted on the base having the substantially horizontal mounting surface, the robot can be put on the base when the robot is being installed. Thus the operator can attach the stationary base unit of the body structure of the robot to the base in the state that the robot is supported from under the robot so as to stable the position of the robot.

Therefore, the operator is able to position the stationary base unit easily at a predetermined position on the mounting surface of the base. Thus the robot can be easily installed. There is no danger of the robot falling off the base during work for installing the stationary base unit on the base. Thus safety in installing the robot can be improved.

According to the present invention, since the rotative driving means for driving the movable unit for turning is fixedly held on the stationary base unit, only a small load is loaded on the rotative driving means when the rotative driving means drives the movable unit for turning. Therefore, the output capacity of the rotative driving means can be made small. Thus the rotative driving means can be small, lightweight and inexpensive.

Fixedly mounting the rotative driving means on the stationary base unit so as to be exposed outside facilitates work for replacing the rotative driving means and work for laying wiring lines connected to the rotative driving means.

Since the cylindrical auxiliary guide member is fixed to the movable unit so as to extend into the stationary-side internal space and defines the auxiliary internal space communicating with the movable-side internal space, the elongate member can be loosely extended through the movable-side internal space and the auxiliary internal space along the axis of rotation.

Since the auxiliary guide member is fixed to the movable unit, the auxiliary guide member turns together with the movable-side guide part of the movable unit about the axis of rotation. Thus the rubbing of the elongate member against the stationary base unit can be suppressed when the movable unit turns relative to the stationary base unit. Consequently, the damaging and breakage of the elongate member due to abrasion can be avoided.

Since the contact member is disposed at the upstream opening of the stationary-side guide part of the stationary base unit so as to protrude radially inward beyond the edge of the upstream opening of the auxiliary guide member and to be in contact with the elongate member, the elongate member is prevented from touching the upstream opening of the auxiliary guide member. Thus the damaging and breakage of the elongate members due to abrasion can be avoided.

Since the contact member is formed in an annular shape extending along the upstream opening of the stationary-side guide part of the stationary base unit, the elongate member can be surely prevented from touching the upstream opening of the auxiliary guide member. Since the spray gun is attached to the end part of the robot arm of the robot and paint is supplied through the paint supply hose to the spray gun, the robot can serve as a painting robot for painting a workpiece. The end part of the robot arm needs to be moved along the workpiece during a painting operation. Since the elongate member connected to the robot arm is loosely extended through the stationary-side and the movable-side internal spaces along the axis of rotation, the damaging and breakage of the elongate member due to abrasion can be avoided when the end part of the robot arm is moved along the workpiece to paint the same.

DESCRIPTION OF THE PREFERRED EMBODIMENTS

Figure 1:
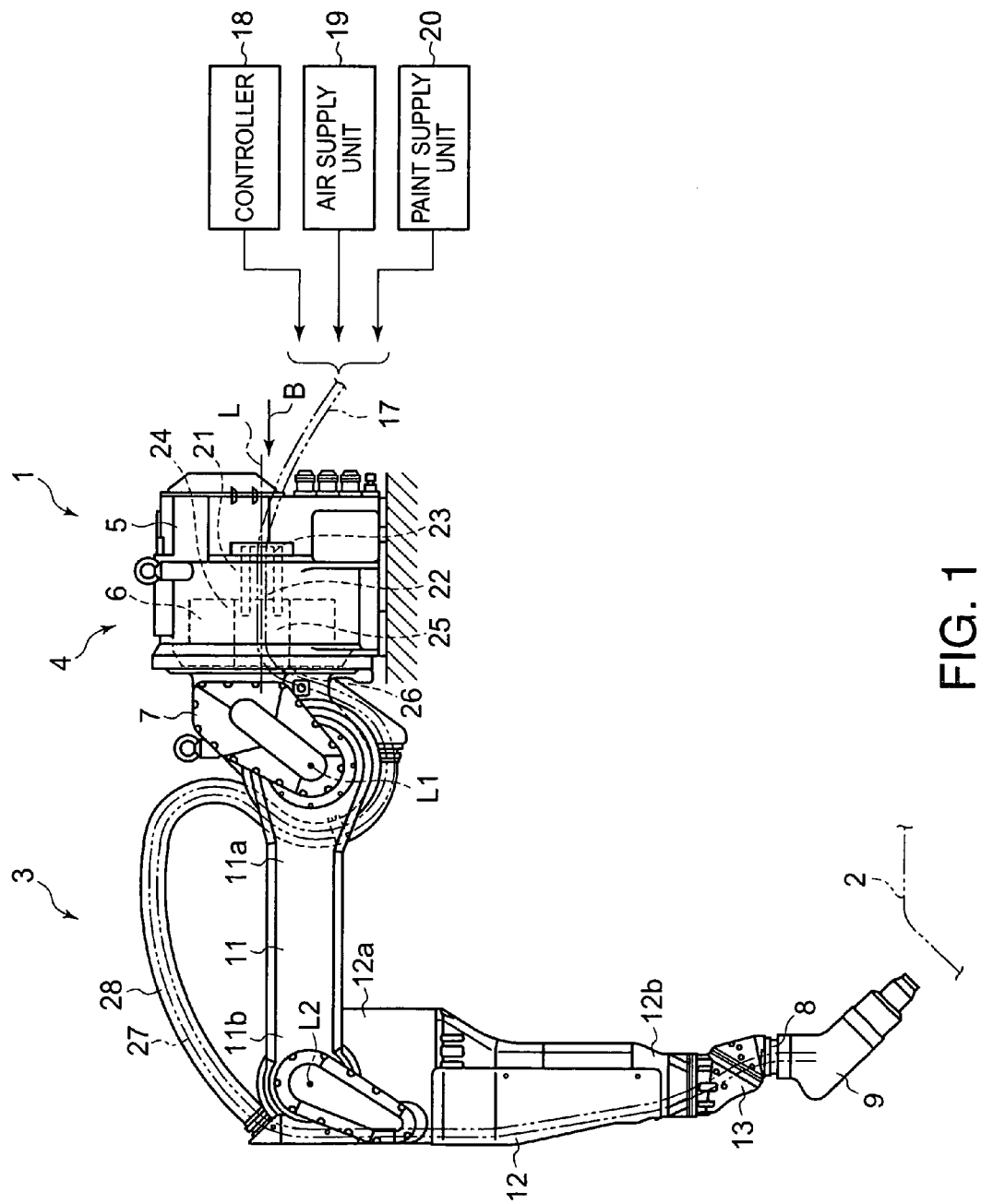
FIG. 1 is a front elevation of a painting robot in a preferred embodiment according to the present invention.
Figure 2:
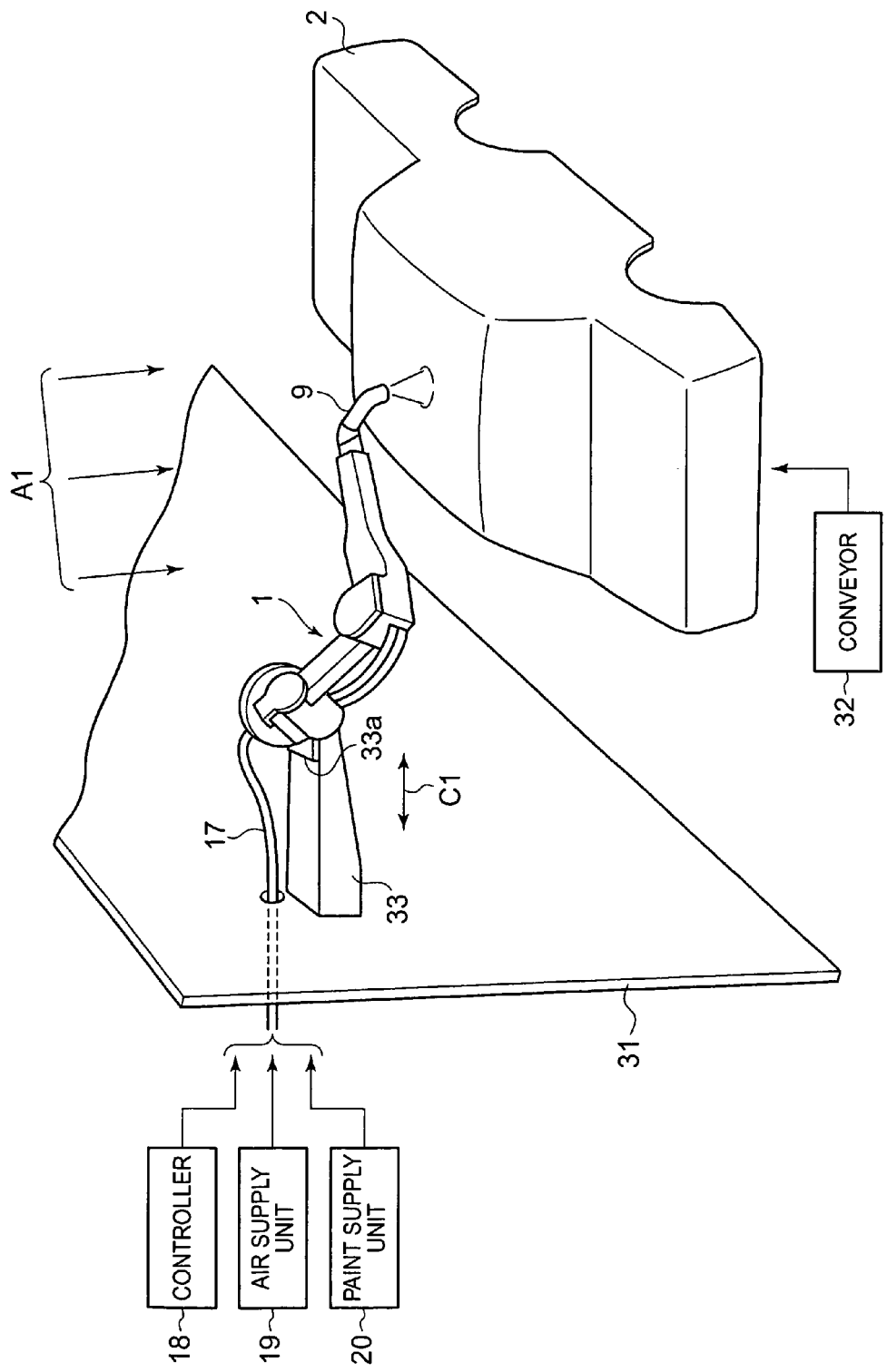
FIG. 2 is a perspective view of the painting robot in the preferred embodiment installed in a painting booth.
Figure 3:
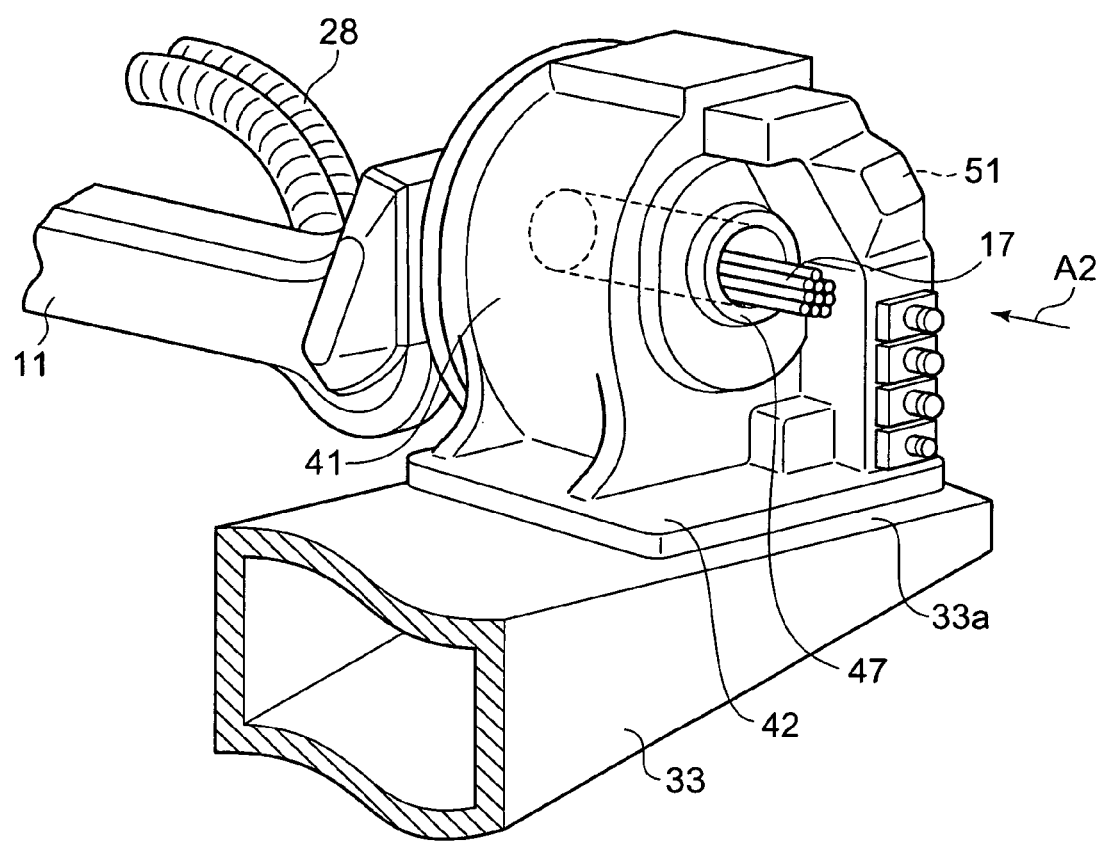
FIG. 3 is a perspective view of a body structure of the painting robot.
Figure 4:
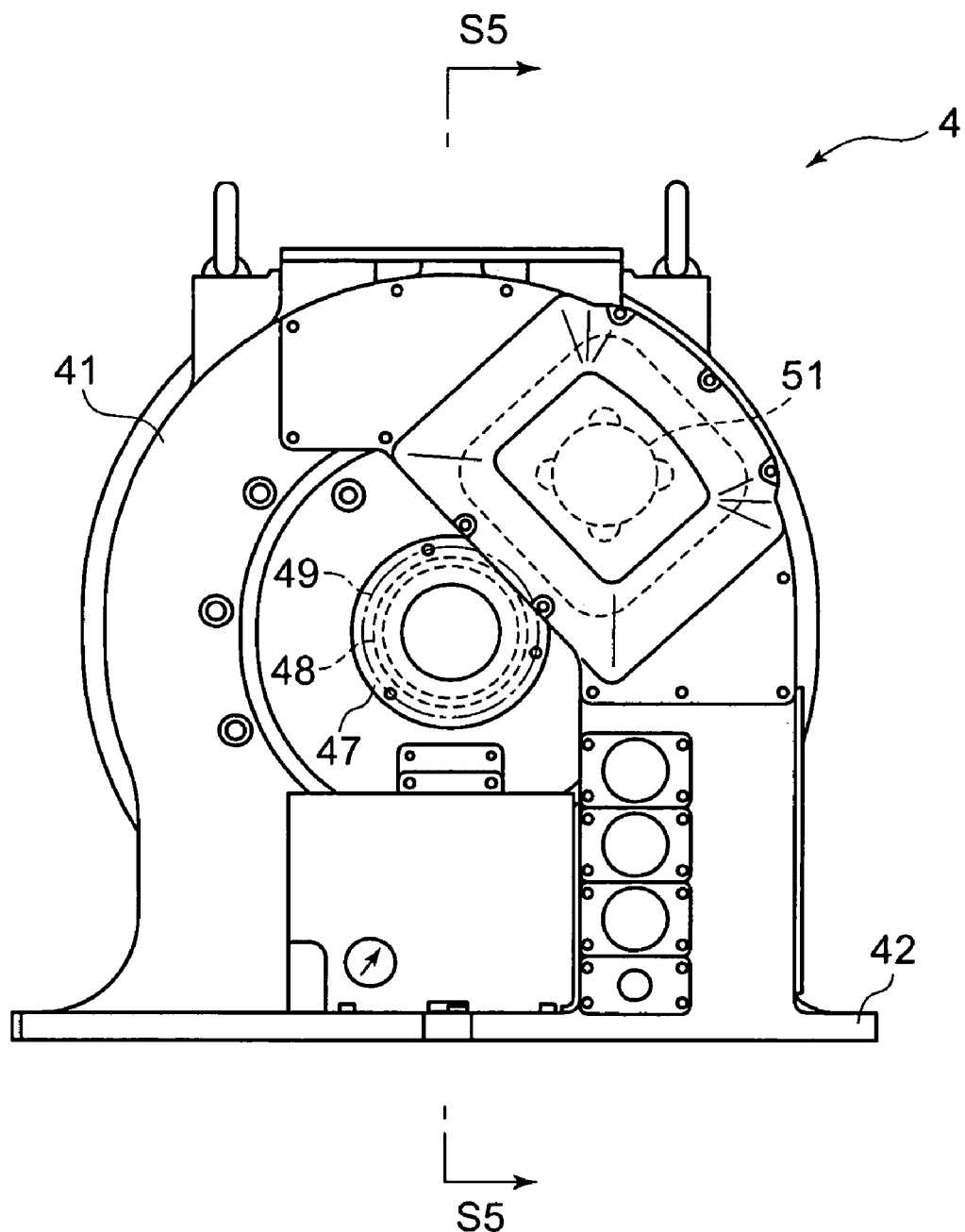
FIG. 4 is a back view of the body structure shown in FIG. 3 taken in the direction of the arrow A2 in FIG. 3.
Figure 5:
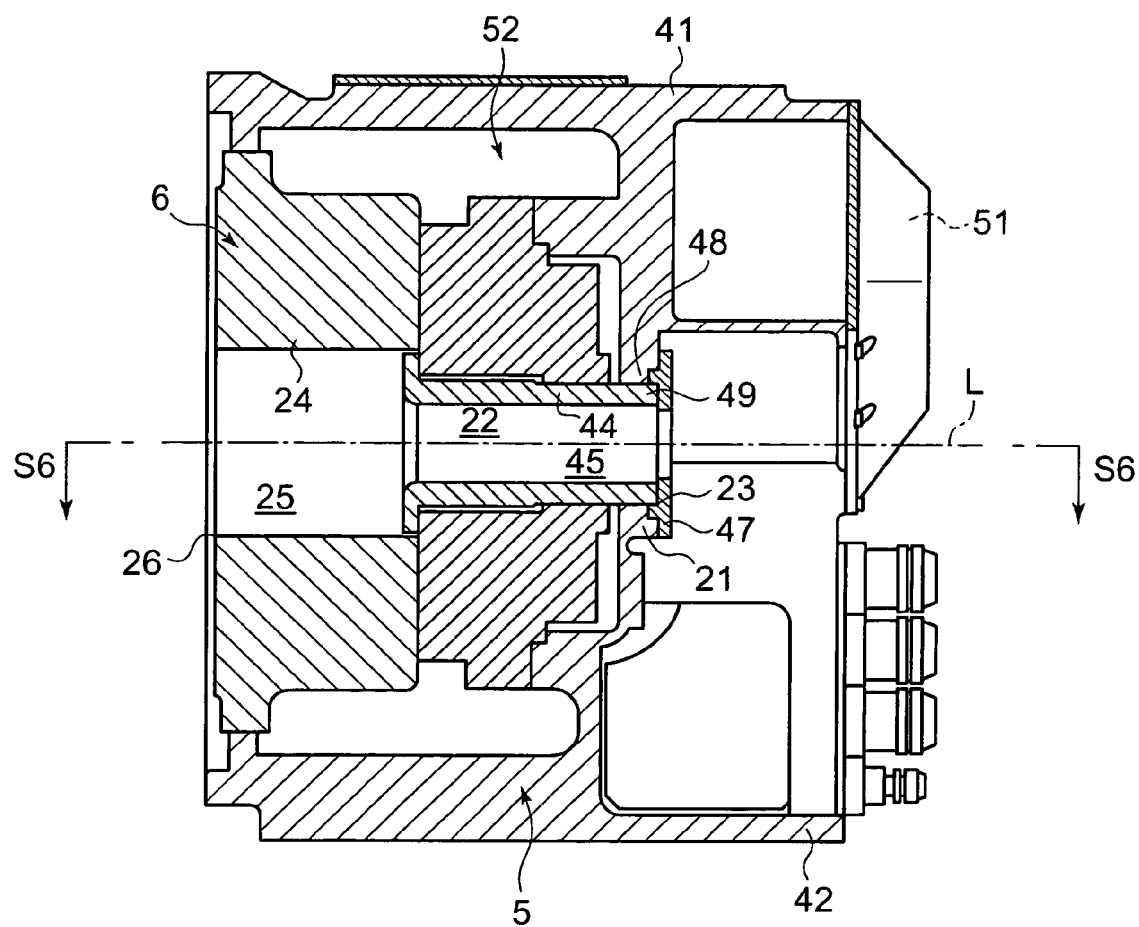
FIG. 5 is a sectional view taken on the line S5-S5 in FIG. 4.
Figure 6:
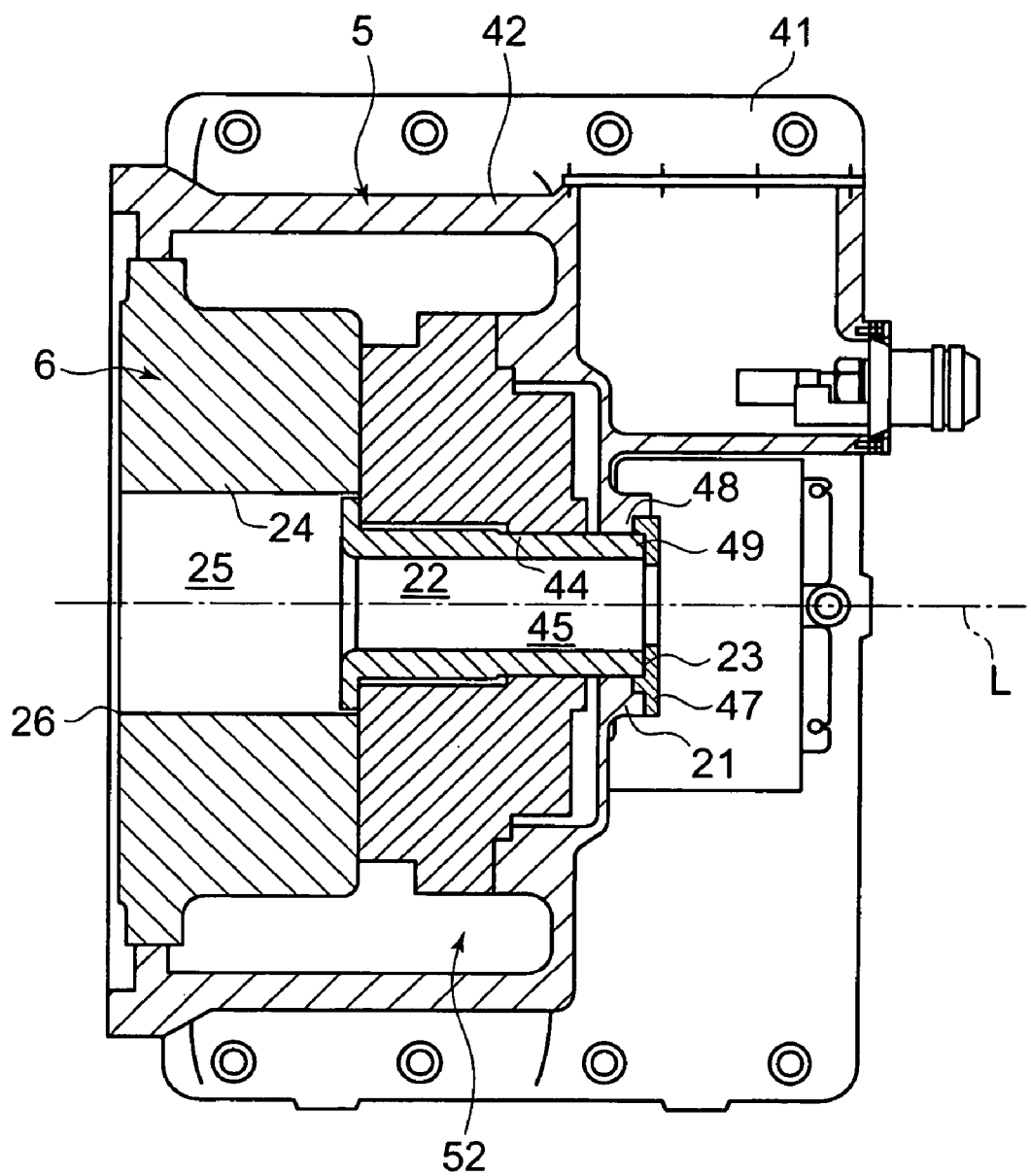
FIG. 6 is a sectional view taken on the line S6-S6 in FIG. 5.

A painting robot 1 of a preferred embodiment according to the present invention shown in FIG. 1 is used for painting a workpiece 2, such as an automotive body as shown in FIG. 2. The painting robot 1 sprays paint on a predetermined part of the workpiece 2 while the workpiece 2 is being conveyed. The painting robot 1 has a robot arm 3 and a body structure 4.

The body structure 4 includes a stationary base unit 5 and a swivel unit (movable unit) 6. The stationary base unit 5 is fixedly installed at a predetermined position. The swivel unit 6 is driven for turning relative to the stationary base unit 5 about an axis L of rotation. The swivel unit 6 is on one side of the stationary base unit 5 on the axis L of rotation.

The robot arm 3 has a base part 7 and a front end part 8. The base part 7 of the robot arm 3 is fixed to the swivel unit 6 of the body structure 4. The base part 7 turns together with the swivel unit 6 about the axis L of rotation. The base part 7 is on one side of the swivel unit 6 on the axis L of rotation. A spray gun 9 as a predetermined end effector is attached to the front end part 8 of the robot arm 3. The spray gun 9 sprays an atomized mist of paint.

The robot arm 3 has a first arm unit 11 and a second arm unit 12. The first arm unit 11 is formed long and has a first end part 11a and a second end part 11b. The second arm unit 12 is formed long and has a first end part 12a and a second end part 12b. The first end part 11a of the first arm unit 11 is connected to the base part 7. The second end part 11b of the first arm unit 11 is connected to the first end part 12a of the second arm unit 12.

The first arm unit 11 is able to turn relative to the base part 7 about a first axis L1 of turning. The first axis L1 of turning is contained in an imaginary plane perpendicular to the axis L of rotation. The first arm unit 11 is driven for turning by a first motor, such as a servomotor, fixedly mounted on the base part 7.

The second arm unit 12 is connected to the first arm unit 11 so as to be able to turn about a second axis L2 of turning parallel to the first axis L1 of turning. The second arm unit 12 is driven for turning by a second motor, such as a servomotor, fixedly mounted on the first arm unit 11.

The robot arm 3 is provided with a spraying direction changing mechanism 13. The spraying direction changing mechanism 13 changes the direction in which the spray gun 9 sprays the paint. The front end part 8 is one of the components of the spraying direction changing mechanism 13.

The painting robot 1 places the spray gun 9 as an end effector in a predetermined position to carry out a predetermined painting operation to paint the workpiece 2.

A plurality of flexible, elongate members 17 are extended on the robot arm 3 to the spray gun 9. The elongate members 17 bend according to the motions of the robot arm 3. The elongate members 17 include cables for carrying power and control signals provided by a controller 18 to the spray gun 9 and devices mounted on the second arm unit 12. The devices mounted on the second arm unit 12 are those necessary for carrying out painting operations including a selector valve for selectively delivering different color paints to the spray gun 9, electropneumatic regulators, solenoid valves and an optical signal receiver. The elongate members 17 include an air supply hose for carrying air from an air supply unit 19 to the spray gun 9 to drive the spray gun 9 and paint supply hoses for carrying paints from a paint supply unit 20 to the spray gun 9.

The elongate members 17 may include a solvent supply hose for carrying a thinner and a cable for charging the spray gun 9 with static electricity. When a pump drive motor is mounted on the second arm unit 12, the elongate members 17 may include cables for supplying power and control signals to the pump drive motor.

The stationary base unit 5 of the body structure 4 has a stationary-side guide part 21. The stationary-side guide part 21 defines a stationary-side internal space 22. The elongate members 17 are extended loosely through the stationary-side internal space 22 along the axis L of rotation. The stationary-side guide part 21 opens upstream in an elongate member inserting direction B in which the elongate members 17 are inserted into the stationary base unit 5. The elongate member inserting direction B is a direction from the stationary-side internal space 22 in the stationary base unit 5 toward a movable-side internal space 25 in the swivel unit 6.

The swivel unit 6 of the body structure 4 has a movable-side guide part 24 defining the movable-side internal space 25. The elongate members 17 are extended loosely through the movable-side internal space 25 along the axis L of rotation. The movable-side guide part 24 opens downstream in the elongate member inserting direction B.

The elongate members 17 are loosely inserted along the rotational axis L into the stationary-side internal space 22 and the movable-side internal space 25. The elongate members 17 extend backward through an entrance (upstream opening) 23 of the stationary-side guide part 21 to the controller 18, the air supply unit 19 and the paint supply unit 20. The elongate members 17 extend forward through the exit 26 of the movable-side guide part 24 to the devices mounted on the second arm unit 12 and to the spray gun 9. Parts 27 of the elongate members 17 extending between the exit 26 of the movable-side guide part 24 and the base end part of the second arm unit 12 are extended in and protected by a flexible duct 28. The flexible duct 28 may be substituted by a cable bearer.

In FIG. 2 showing the painting robot 1 installed in a painting booth in a perspective view, a wall 31 demarcates the painting booth in a factory. Air currents flow downward in the painting booth as indicated by the arrows A1. A conveyor 32 for conveying the workpiece 2 and the painting robot 1 are installed in the painting booth. The painting robot 1 paints the workpiece 2 being conveyed by the conveyor 32. The controller 18, the air supply unit 19 and the paint supply unit 20 are placed outside the painting booth demarcated by the wall 31.

The painting robot 1 is installed in a so-called on-shelf configuration. A bracket 33 projects horizontally as indicated by the arrows C1 into the painting booth from the wall 31. The bracket 33 has a substantially horizontal mounting surface 33a. The term "substantially horizontal" is used also to signify a perfectly horizontal quality. The angle between the mounting surface 33a and a horizontal plane is substantially 0° in the present embodiment. Namely, the mounting surface 33a is horizontal. The stationary base unit 5 of the painting robot 1 is fixedly supported on the horizontal mounting surface 33a of the bracket 33.

The body structure 4 of the painting robot 1 is disposed in a space above a space in which the workpiece 2 is conveyed by the conveyor 32. Since air currents flow downward in the painting booth and the body structure 4 is in the space above a space in which the workpiece 2 is conveyed, the painting robot 1 is prevented from being contaminated with the paint sprayed by the spray gun 9. The body structure 4 does not need necessarily to be disposed in a space above a space in which the workpiece 2 is conveyed; the body structure 4 may be disposed at a level lower than that of the workpiece 2.

Referring to FIGS. 3 to 6, the stationary base unit 5 has a generally cylindrical stationary body part 41 and a support part 42 supporting the stationary body part 41 thereon. The stationary body part 41 has the stationary-side guide part 21. The stationary-side guide part 21 defines the inner circumference of the stationary body part 41. The stationary-side guide part 21 is generally cylindrical. The stationary-side guide part 21 and the stationary body part 41 are coaxial. The support part 42 is joined to the outer circumferential surface of the stationary body part 41. When the painting robot 1 is mounted on the bracket 33, the support part 42 supports the stationary body part 41 and the stationary-side guide part 21 with their axes extended parallel to the mounting surface 33a.

The swivel unit 6 is generally cylindrical. The swivel unit 6 has the movable-side guide part 24 defining the inner circumference of the swivel unit 6. The movable-side guide part 24 is generally cylindrical. The movable-side guide part 24 and the swivel unit 6 are coaxial.

The swivel unit 6 is coaxial with the stationary body part 41. The respective axes of the swivel unit 6 and the stationary body part 41 are aligned with the axis L of rotation. The swivel unit 6 is able to turn about the axis L of rotation relative to the stationary body part 41 of the stationary base unit 5.

The body structure 4 has a cylindrical auxiliary guide member 44. The auxiliary guide member 44 is inserted in the stationary-side internal space 22 and is fixed to the swivel unit 6. The axis of the auxiliary guide member 44 is aligned with the axis L of rotation. The auxiliary guide member 44 defines an auxiliary space 45 in which the elongate members 27 are extended loosely along the axis L of rotation. The auxiliary space 45 communicates with the movable-side internal space 25 of the swivel unit 6. The elongate members 17 extended along the robot arm 3 and connected to the spray gun 9 are extended loosely through the auxiliary space 45 contained in the stationary-side internal space 22, and the movable-side internal space 25 along the axis L of rotation.

The body structure 4 is provided with a contact member 47. The contact member 47 is disposed at the entrance 48 of the stationary-side internal space 21. The contact member 47 is an annular member surrounding the entrance 48 of the stationary-side internal space 21. The contact member 47 has an inner peripheral part protruding radially inward beyond the edge of the entrance of the auxiliary guide member 44. Thus the inner peripheral part of the contact member 47 protrudes toward the axis L or rotation. The elongate members 17 passed through the entrance 23 of the stationary-side guide part 21 come into contact with the inner circumference of the contact member 47.

A third motor 51 for driving the swivel unit 6 for turning is mounted on the body structure 4. The third motor 51 is fixedly mounted on the stationary body part 41 of the stationary base unit 5. The third motor 51 is on the back side of the stationary body part 41 so that the third motor 51 does not cover the entrance 23 of the stationary-side guide part 21.

The driving force of the third motor 51 is transmitted through a reduction gear 52 to the swivel unit 6. The reduction gear 52 has a through hole having an axis aligned with the axis L of rotation. The reduction gear 52 is a RV reduction gear (rotor vector reduction gear), a Harmonic drive® or the like.

Figure 7:
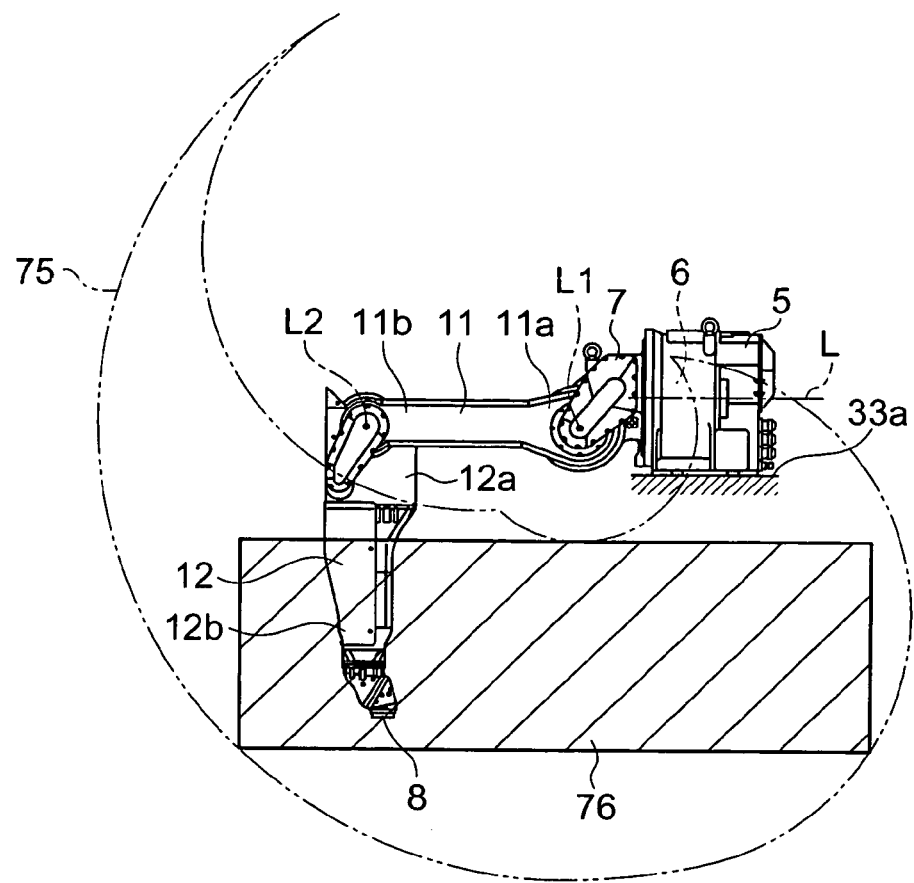
FIG. 7 is a view of assistance in explaining a representative work area in which the painting robot in the preferred embodiment operates.

As shown in FIG. 7, the painting robot 1 is fixedly mounted on the bracket 33 having the horizontal mounting surface 33a. When the painting robot 1 is set in a predetermined reference state, the first arm unit 11 is extended parallel to the mounting surface 33a and the second arm unit 12 is extended perpendicularly to the mounting surface 33a. In other words, when the painting robot 1 is set in the reference state, the first arm unit 11 extends horizontally from the base part 7 and the second arm unit 12 extends vertically downward from the second end part 11b of the first arm unit 11.

When the painting robot 1 is set in the reference state, the swivel unit 6 is set at a reference position about the axis L of rotation. The swivel unit 6 is turned from the reference position in opposite directions about the axis L of rotation. The swivel unit 6 can be turned from the reference position in opposite directions about the axis L of rotation through a predetermined angle, such as an angle of 90° or below.

The first arm unit 11 can be turned from its reference position, where the first arm unit 11 is positioned when the painting robot 1 is set in the reference state, in opposite directions on the base part 7 about the first axis 1 of turning. The first arm unit 11 can be turned about the first axis L1 of turning in a direction to move the second end part 11b thereof downward in FIG. 7 from the reference position through a predetermined first angle of turning of, for example, 110° or below and can be turned about the first axis L1 of turning in a direction to move the second end part 11b thereof upward in FIG. 7 from the reference position through a predetermined second angle of turning of, for example, 60° or below.

The second arm unit 12 can be turned from its reference position, where the second arm unit 12 is positioned when the painting robot 1 is set in the reference state, in opposite directions relative to the first arm unit 11 about the second axis L2 of turning. The second arm unit 12 can be turned about the second axis L2 of turning in a direction to move the second end part 12b thereof to the right in FIG. 7 from the reference position through a predetermined third angle of turning of, for example, 65° or below and can be turned about the second axis L2 of turning in a direction to move the second end part 12b thereof to the left in FIG. 7 from the reference position through a predetermined fourth angle of turning of, for example, 90° or below.

When the painting robot 1 is set in the reference state, the front end part 8 of the robot arm 3 can be optionally moved in a region 75 demarcated by imaginary lines in FIG. 7 by turning the first arm unit 11 and the second arm unit 12 without turning the swivel unit 6. The front end part 8 of the robot arm 3 is moved in a rectangular region 76, i.e., a shaded region contained in the region 75 demarcated by the imaginary lines in FIG. 7, extending in a direction parallel to the axis L of rotation below the painting robot 1 to paint the workpiece 2.

Figure 8:
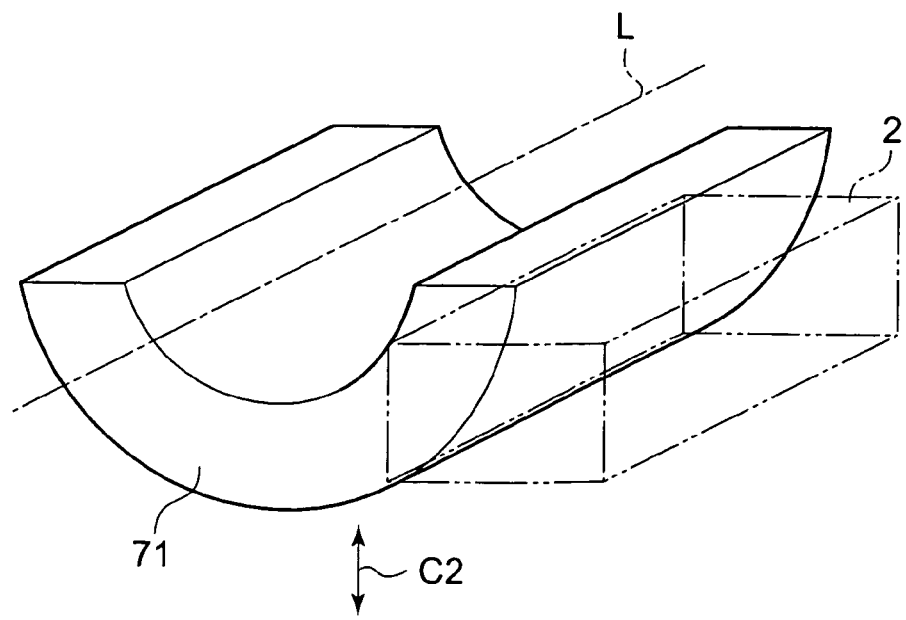
FIG. 8 is a perspective view of the representative work area in which the painting robot in the preferred embodiment operates.

Since the swivel unit 6 can be turned about the axis L of rotation parallel to the mounting surface 33a, the representative work area 71 in which the painting robot 1 is able to paint the workpiece 2 is a semicylindrical space as shown in FIG. 8. The representative work area 71 is a space defined by two semicylindrical surfaces respectively corresponding to halves of cylindrical surfaces having different radii and the same center axes aligned with the axis L of rotation and extending along the axis L of rotation.

Figure 9:
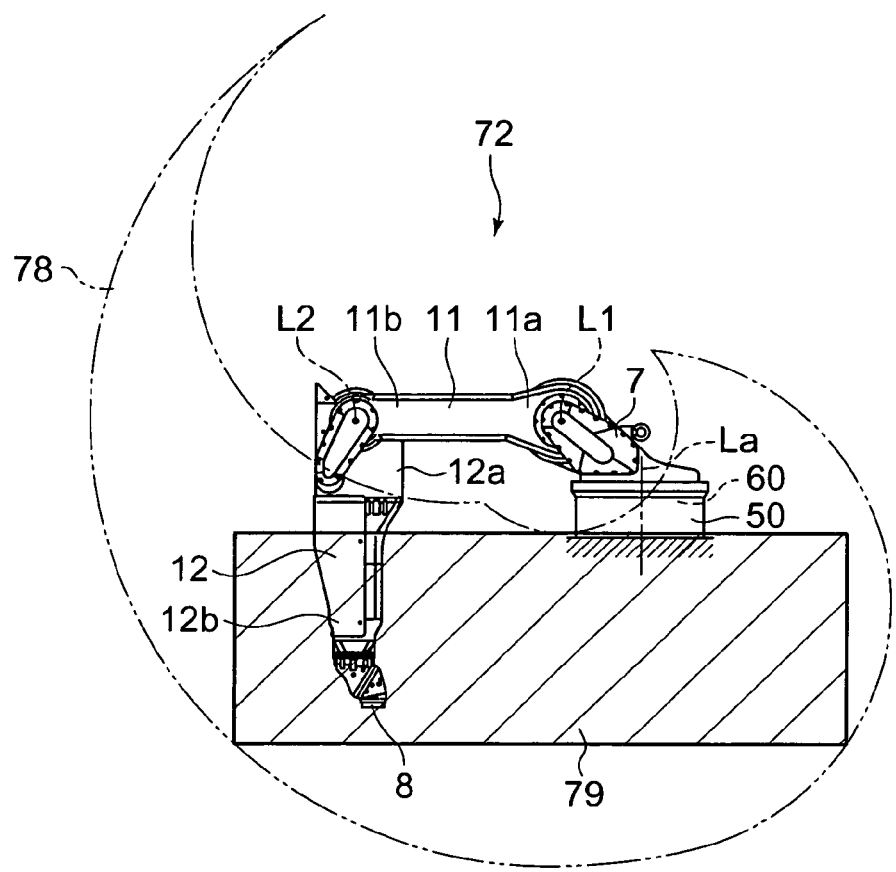
FIG. 9 is a view of assistance in explaining a representative work area in which a painting robot in a first comparative example operates.
Figure 10:
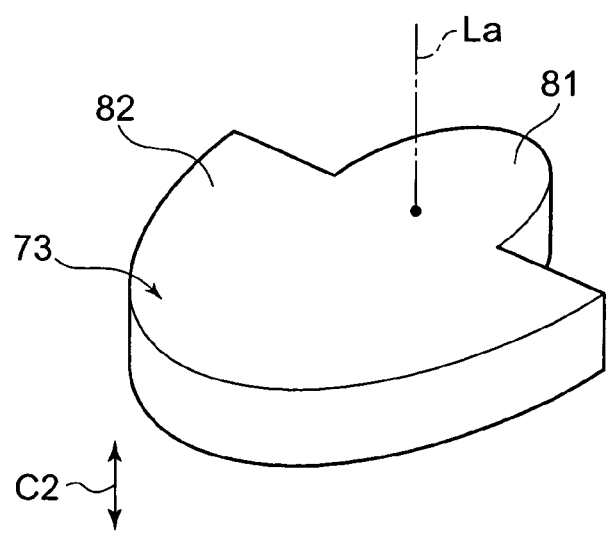
FIG. 10 is a perspective view of the representative work area in which the painting robot in the first comparative example operates.

The painting robot 72 in the first comparative example shown in FIG. 9 is similar to the painting robot 1 of the present embodiment in some respects. In FIGS. 9 and 10, parts like or corresponding to those of the painting robot 1 of the present embodiment are denoted by the same reference characters and the description thereof will be omitted. The painting robot 72 has a stationary base unit 50 and a swivel unit 60. The painting robot 72 differs from the painting robot 1 in that the swivel unit 60 turns relative to the stationary base unit 50 about an axis La of rotation which is perpendicular to the mounting surface 33a.

When the painting robot 72 in the first comparative example is in a reference state, a front end part 8 of a robot arm 3 can be moved to an optional position in an area 78 demarcated by imaginary lines in FIG. 9 by turning a first arm unit 11 and a second arm unit 12 without turning the swivel unit 60. The painting robot 72 in the first comparative example can paint the work 2 by moving the front end part 8 of the robot arm 3 in a shaded rectangular area 79 shown in FIG. 9.

Since the swivel unit 60 of the painting robot 72 can be turned about the axis La of rotation perpendicular to the mounting surface 33a, the painting robot 72 can paint the workpiece 2 in a representative work area 73 shown in FIG. 10. The representative work area 73 for the painting robot 72 includes a semicylindrical first area 81 corresponding to half a cylindrical area having a center axis aligned with the axis La of rotation and a semicylindrical second area 81 corresponding to half a cylindrical area having a radius greater than that of the first area 81 and a center axis aligned with the axis La of rotation.

Whereas the painting robot 72 in the first comparative example can adjust the height of the front end part 8 of the robot arm 3 by turning the first arm unit 11 and the second arm unit 12, the painting robot 1 of the present embodiment can adjust the height of the front end part 8 of the arm 8 by turning the swivel unit 6 as well as by turning the first arm unit 11 and the second arm unit 12. Thus, the front end part 8 of the robot arm 3 of the painting robot 1 of the present embodiment can extend the work area in which the front end part 8 can be moved in vertical directions C2. Thus the representative work area 71 in which the painting robot 1 operates has a large dimension with respect to the vertical directions C2.

Figure 11:
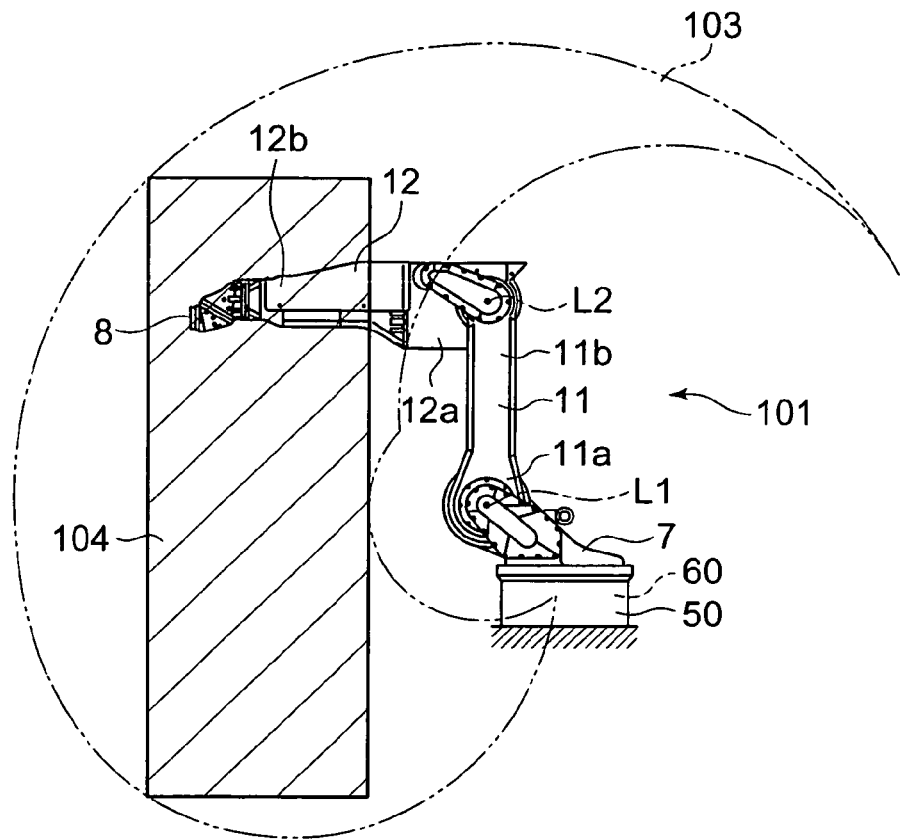
FIG. 11 is a view of assistance in explaining a representative work area in which a painting robot in a second comparative example operates.
Figure 12:
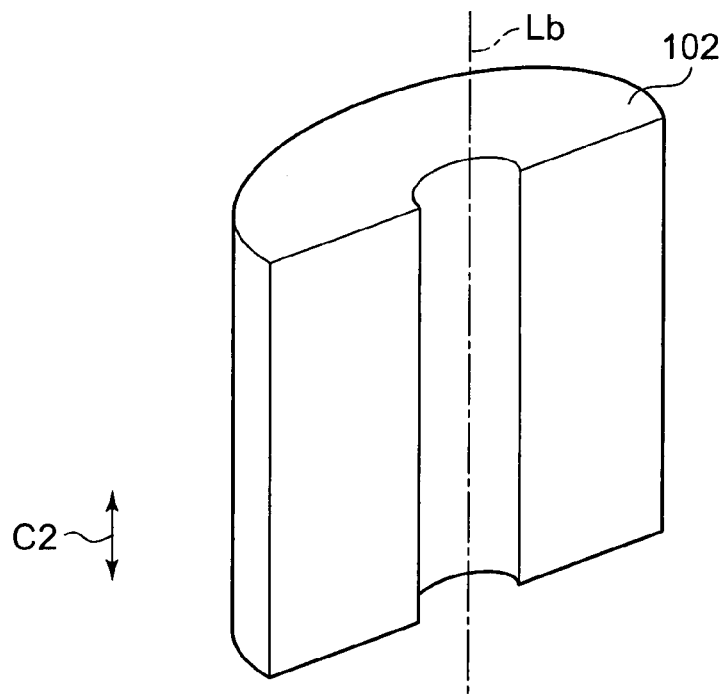
FIG. 12 is a perspective view of the representative work area in which the painting robot in the second comparative example operates.

A painting robot 101 in second comparative example shown in FIG. 11 is similar to the painting robot 72 in the first comparative example. In FIGS. 11 and 12, parts like or corresponding to those of the painting robot 72 in the first comparative example are denoted by the same reference characters and the description thereof will be omitted. The painting robot 101 in the second comparative example differs from the painting robot 72 in the first comparative example in that a first arm unit 11 extends vertically upward from a base part 7 and a second arm unit 12 extends horizontally from a second end part 11b of the first arm unit 11.

when the painting robot 101 in the second comparative example is in a reference state, the front end part 8 of the robot arm 3 can be moved to an optional position in an area 103 demarcated by imaginary lines in FIG. 11 by turning the first arm unit 11 and the second arm unit 12 without turning the swivel unit 60 when the painting robot 101 is in the reference state. The painting robot 101 in the second comparative example can paint the work 2 by moving the front end part 8 of the robot arm 3 in a shaded rectangular area 104 shown in FIG. 11 contained in the area 103 demarcated by imaginary lines.

Since the swivel unit 60 of the painting robot 101 can be turned about an axis Lb of rotation perpendicular to the mounting surface 33a, the painting robot 101 can paint the workpiece 2 in a representative work area 102 shown in FIG. 12. The representative work area 102 for the painting robot 101 is a space defined by two semicylindrical surfaces respectively corresponding to halves of cylindrical surfaces having different radii and the same center axes aligned with the vertical axis Lb of rotation.

Although the work area 102 for the painting robot 101 has a large vertical dimension with respect to vertical directions C2, a second end part 11b of the first arm unit 11 needs to be raised to a level higher than the mounting surface when the painting robot 101 operates for painting in an upper part of the work area 102. Therefore, the painting robot 101 must be installed in a high-ceilinged painting booth. On the other hand, the painting robot 1 of the present embodiment in the reference state can perform a painting operation in an upper part of the work area 71 by turning the swivel unit 6 through 90° and operating the first arm unit 11 and the second arm unit in a substantially horizontal imaginary plane. Thus the painting robot 1 of the present embodiment can be installed in a low-ceilinged painting booth.

Figure 13:
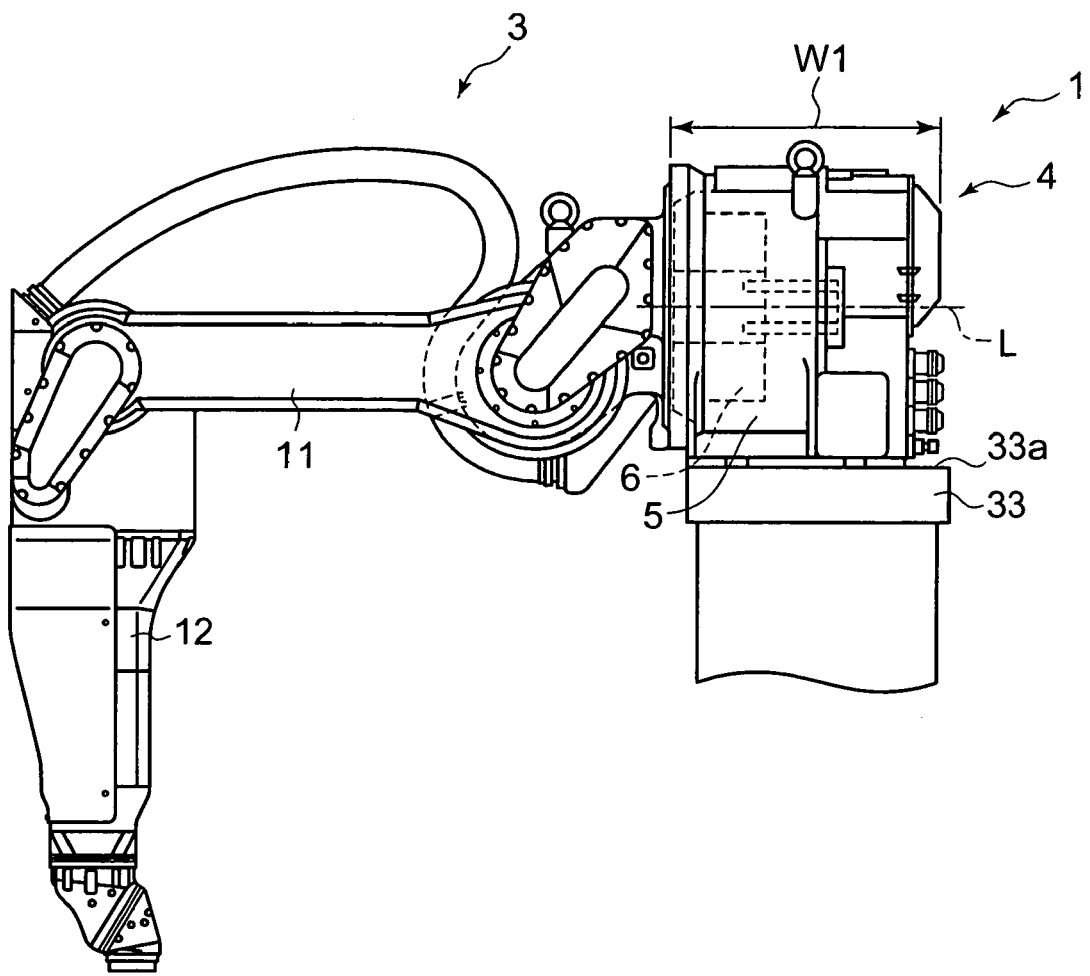
FIG. 13 is a front elevation of the painting robot in the preferred embodiment installed at a predetermined position.
Figure 14:
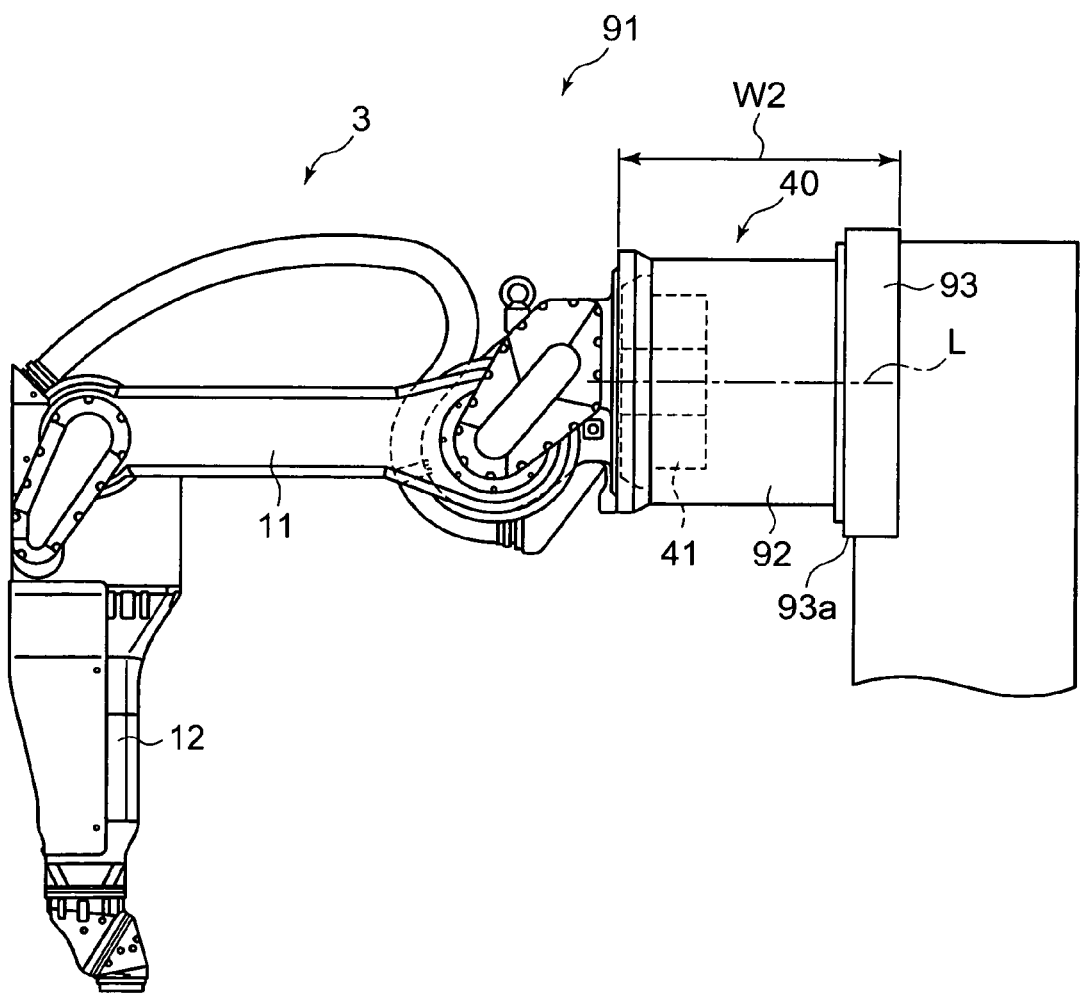
FIG. 14 is a front elevation of a painting robot in a third comparative example installed at a predetermined position.

FIG. 13 is a front elevation of the painting robot 1 of the present embodiment installed at a predetermined position and FIG. 14 is a front elevation of a painting robot 91 in a third comparative example installed at a predetermined position. The painting robot 91 in the third comparative example is similar to the painting robot 1 of the present embodiment in some respects. In FIG. 14, parts like or corresponding to those of the painting robot 1 are denoted by the same reference characters and the description thereof will be omitted. The painting robot 91 in the third comparative example differs from the painting robot 1 of the present embodiment in that a support part 92 is on the back side of a stationary body part 41 with respect to a direction parallel to an axis L of rotation.

The painting robot 91 is a so-called wall-mounted painting robot. The painting robot 91 is fixedly installed on a base 93 having a vertical mounting surface 93a. The base 93 protrudes in the horizontal direction C1 from the wall of a painting booth. On the other hand, the painting robot 1 of the present embodiment is a shelf-mounted painting robot.

Whereas the wall-mounted painting robot 91 in the third comparative example cannot stay automatically on the base 93 during installation work for installing the painting robot 91, the shelf-mounted painting robot 1 of the present embodiment can stay automatically on the bracket 33 during installation work. Therefore, the operator is able to attach the stationary base unit 5 of the body structure 4 of the painting robot 1 to the bracket 33 while the painting robot 1 is supported stably on the bracket 33.

Thus the operator is able to locate the stationary base unit 5 easily at a predetermined position on the mounting surface 33a of the bracket 33. Thus the painting robot 1 facilitates installation work. There is no danger of the painting robot 1 falling down while the operator is at work for fastening the stationary base unit 5 to the bracket 33. Thus the safety of installation work for installing the painting robot 1 can be improved.

In this embodiment of the present invention, the mounting surface 33a is contained in a horizontal plane. However, the mounting surface 33a does not need to be contained in a horizontal plane and may be inclined to a horizontal plane at an angle in the range of 0° to 30°. When the inclination of the mounting surface is in the range of 0° and 30°, the painting robot 1 is able to stay stably on the mounting surface 33a while the operator is at work for fastening the stationary base unit 5 to the bracket 33. If the inclination of the mounting surface 33a is greater than 30°, the painting robot 1 cannot stay stably on the bracket 33 while the operator is at work for fastening the stationary base unit 5 to the bracket 33.

In the wall-mounted painting robot 91, the base 93 is on the back side of a body structure 40 with respect to a direction parallel to the axis L of rotation. Therefore, a space for containing the body structure 40 and the base 93 extends along the axis L of rotation. On the other hand, in the shelf-mounted painting robot 1, the body structure 4 and the bracket 33 are at the same position with respect to a direction parallel to the axis L of rotation. Therefore, the painting robot 1 needs a space having a dimension corresponding only to the body structure 4 with respect to a direction parallel to the axis L of rotation. The dimension of the space necessary for installing the shelf-mounted painting robot 1 with respect to a direction parallel to the axis L of rotation is smaller than that necessary for installing the wall-mounted painting robot 91 by a size corresponding to that of the base 93.

In the painting robot 1 of the present embodiment, the elongate members 17 connected to the robot arm 3 are extended loosely through the stationary-side internal space 22 and the movable-side internal space 25 substantially linearly along the axis L of rotation. Therefore, the displacement of the elongate members 17 about the axis L of rotation in the stationary-side internal space 22 and the movable-side internal space 25 can be suppressed when the swivel unit 6 turns relative to the stationary base unit 5. Thus the rubbing of the elongate members 17 against the stationary-side guide part 21 and the movable-side guide part 24 can be suppressed. Consequently, the damaging and breakage of the elongate members 17 due to abrasion can be avoided.

In the present embodiment, the elongate members 17 can be loosely extended through the stationary-side internal space 22 and the movable-side internal space 25 along the axis L of rotation, the stationary-side guide part 21 opens upstream in the elongate member inserting direction B in which the elongate members 17 are inserted into the stationary base unit 5 and the movable-side guide part 24 opens downstream in the elongate member inserting direction B. Therefore, the bending of the elongate members 17 in the vicinity of the stationary base unit 5 and the swivel unit 6 can be limited to the least possible extent. Thus the exertion of unnecessary force on the elongate members 17 can be avoided.

If a plurality of curved elongate members 17 are twisted, the elongate members 17 are liable to interfere with each other, undesired force acts on the elongate members 17 and the elongate members 17 are progressively abraded. However, in the present embodiment, since the bending of the elongate members 17 is limited to the least possible extent, the elongate members 17 will not interfere heavily with each other and the rubbing of the elongate members 17 against each other can be suppressed when the swivel unit 6 is turned relative to the stationary base unit 5. Thus the damaging and breakage of the elongate members 17 due to abrasion can be prevented.

Since the bending of the elongate members 17 in the vicinity of the stationary base unit 5 and the swivel unit 6 is limited to the least possible extent, the elongate members 17 can be neatly arranged in the stationary-side internal space 22 and the movable-side internal space 25, which facilitates work for arranging the elongate members 17. The elongate members 17 can be easily replaced with new ones when they are broken.

Since the bending of the elongate members 17 in the vicinity of the stationary base unit 5 and the swivel unit 6 can be limited to the least possible extent, the elongate members 17 can be neatly arranged.

The support part 42 is joined to the outer circumferential surface of the stationary body part 41 and the entrance 23 of the stationary-side guide part 21 opens backward. Therefore, the operator is able to lay the elongate members 17 in the stationary-side internal space 22 and the movable-side internal space 25 while visually recognizing the entrance 48 of the stationary-side guide part 21 from behind the body structure 4 with the painting robot 1 installed on the bracket 33. Thus the elongate members 17 can be easily arranged in the stationary-side internal space 22 and the movable-side internal space 25.

The third motor 51 for driving the swivel unit 6 for turning is fixed to the stationary base unit 5. Since the third motor 51 is placed on the stationary base unit 5, the weight of the swivel unit 6 is smaller than that of the same when the third motor 51 is placed on the swivel unit 6. Therefore, only a small load is loaded on the third motor 51 when the third motor 51 drives the swivel unit 6 for turning. Therefore, the output capacity of the third motor 51 can be made small. Thus the third motor 51 can be small, lightweight and inexpensive.

The third motor 51 is fixedly mounted on the stationary base unit 5 so as to be exposed outside. Therefore, work for replacing the third motor 51 and work for laying wiring lines connected to the third motor 51 can be easily achieved.

The cylindrical auxiliary guide member 44 is inserted in the stationary-side internal space 22. The auxiliary guide member 44 defines the auxiliary space 45 communicating with the movable-side internal space 25. The elongate members are extended loosely through the movable-side internal space 25 and the auxiliary space 45 along the axis L of rotation.

Since the auxiliary guide member 44 is fixed to the swivel unit 6, the auxiliary guide member 44 turns together with the movable-side guide part 24 of the swivel unit 6 about the axis L of rotation. Thus the rubbing of the elongate members 17 against the stationary-side guide part 21 can be suppressed when the swivel unit 6 turns relative to the stationary base unit 5. Consequently, the damaging and breakage of the elongate members 17 due to abrasion can be avoided.

Since the movable-side guide part 24 and the auxiliary guide member 44 are generally cylindrical, the rubbing of the elongate members 17 against the movable-side guide part 24 and the auxiliary guide member 44 can be suppressed when the swivel unit 6 turns relative to the stationary base unit 5. Thus the damaging and breakage of the elongate members 17 due to abrasion can be avoided.

Since the contact member 47 is disposed at the entrance 48 of the stationary-side guide part 21 so as to protrude radially inward beyond the edge of the entrance 49 of the auxiliary guide member 44 and to be in contact with the elongate members 17, the elongate members 17 are prevented from touching the entrance 49 of the auxiliary guide member 44. Therefore, the rubbing of the elongate members 17 against the entrance 49 of the auxiliary guide member 44 can be prevented. Thus the damaging and breakage of the elongate members 17 due to abrasion can be avoided.

The contact member 47 is formed in an annular shape extending along the entrance 48 of the stationary-side guide part 21. Therefore, the elongate members 17 can be surely prevented from touching the entrance 49 of the auxiliary guide member 44. For example, even if the elongate members 17 bend, the elongate members 17 can be surely prevented from touching the entrance 49 of the auxiliary guide member 44. The contact member 47 can be surely fixed to the entrance 49 of the auxiliary guide member 44 since the contact member 47 has an annular shape. The contact member 47 can be easily fabricated since it as the annular shape.

Figure 15:
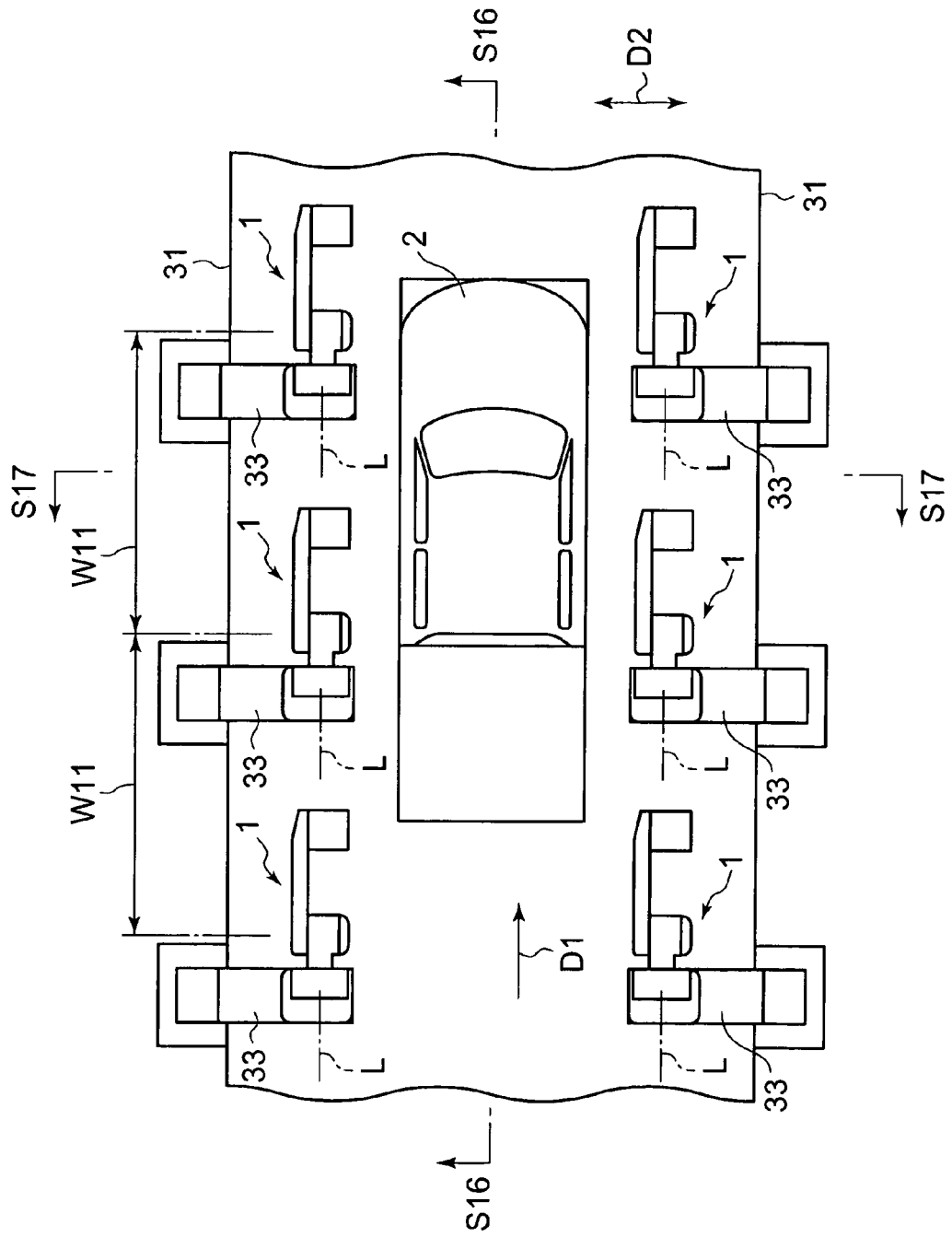
FIG. 15 is a plan view of the painting robots in the preferred embodiment arranged at predetermined positions, respectively.
Figure 16:
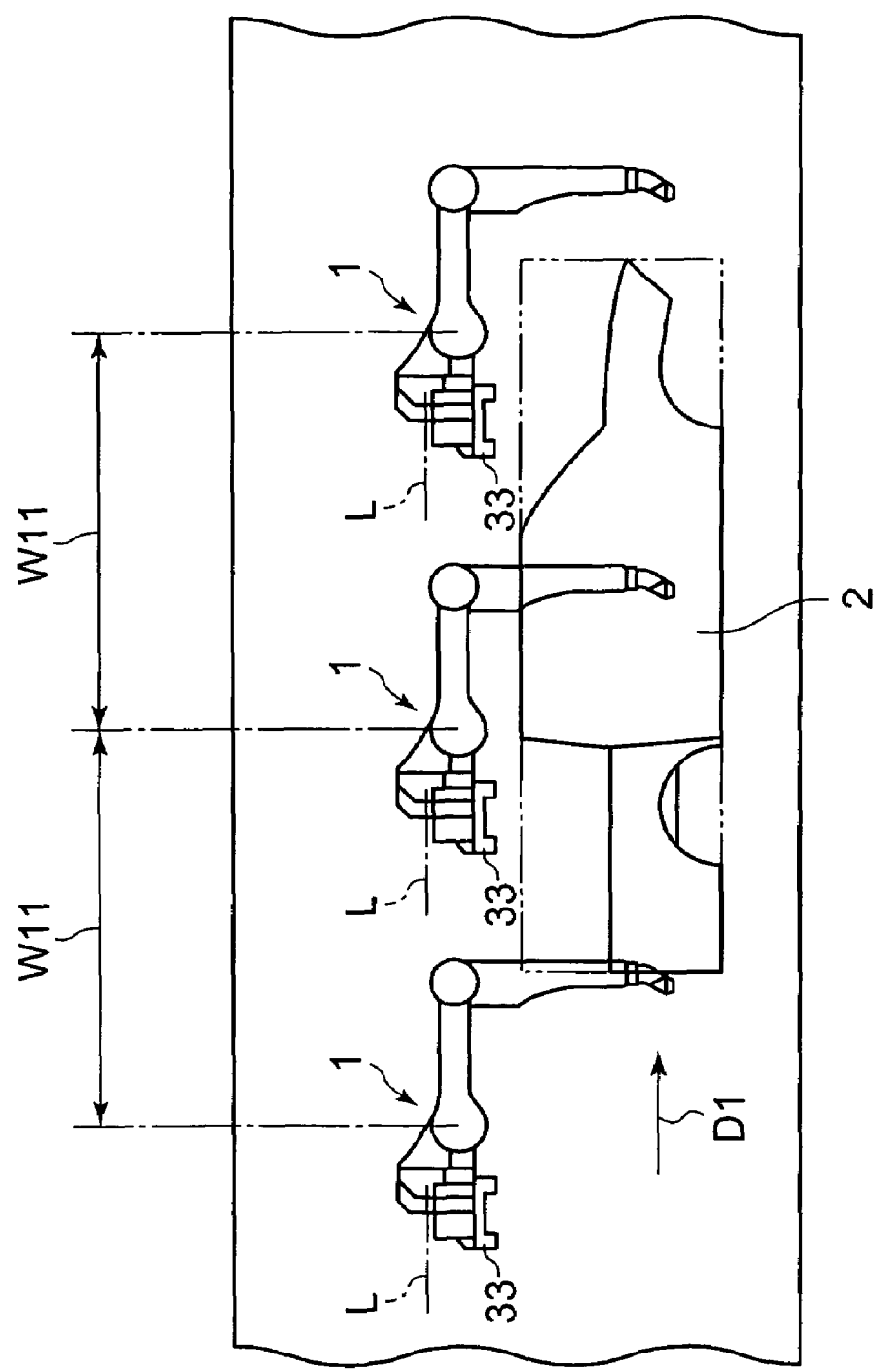
FIG. 16 is a sectional view taken on the line S16-S16 in FIG. 15.
Figure 17:
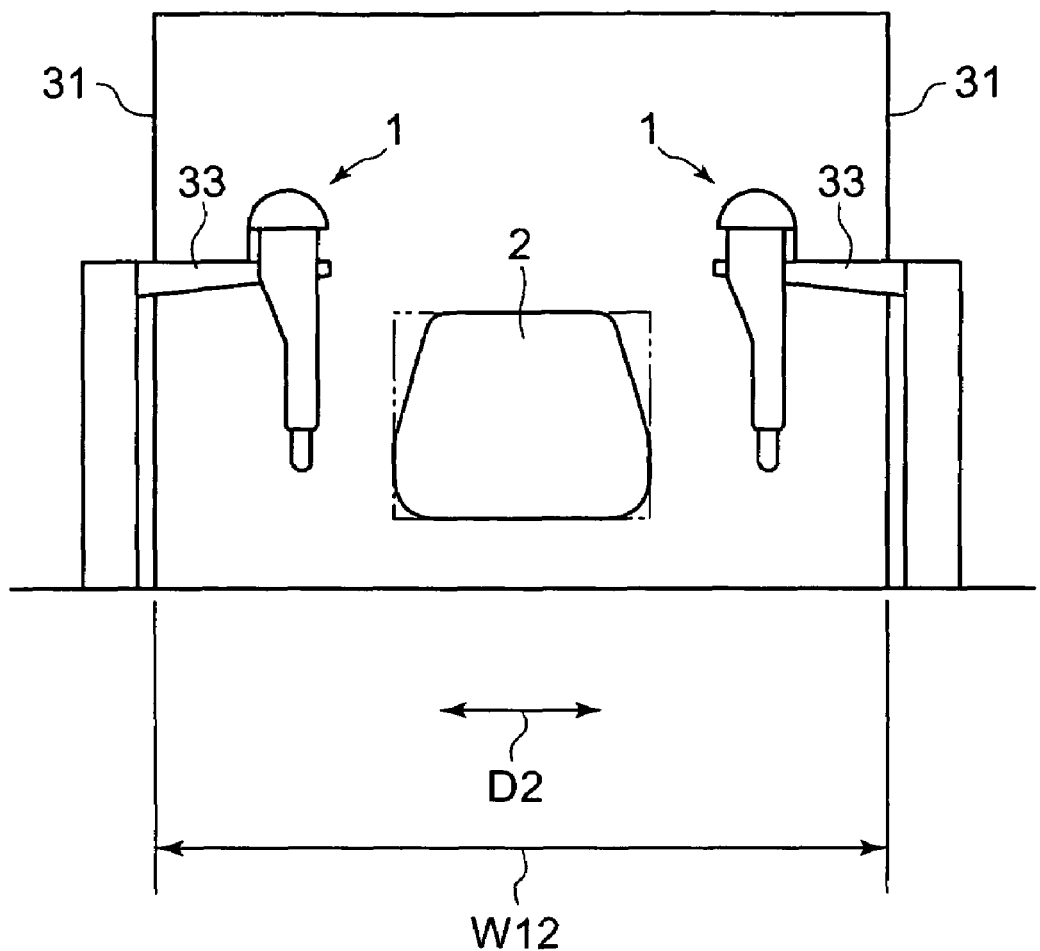
FIG. 17 is a sectional view taken on the line S17-S17 in FIG. 15.

FIG. 15 is a plan view of the painting robots 1 arranged at predetermined positions, respectively, FIG. 16 is a sectional view taken on the line S16-S16 in FIG. 15 and FIG. 17 is a sectional view taken on the line S17-S17 in FIG. 15. FIGS. 15 to 17 show the arrangement of the painting robots 1 for painting the workpiece 2 while the workpiece 2 is being conveyed continuously.

A painting booth extends longitudinally in a workpiece conveying direction D1. The plurality of painting robots 1 are arranged in the workpiece conveying direction D1 in the painting booth at predetermined intervals W11 in two rows on the opposite sides of a workpiece conveying path.

Each of the painting robots 1 is disposed so that the axis L of rotation thereof is parallel to the workpiece conveying direction D1, i.e., the axis L of rotation thereof is parallel to the length of the painting booth. The painting booth has a width W12, namely, a dimension parallel to a lateral direction D2. The width W12 is smaller than a width in which the painting booth needs to be formed when the painting robots 1 are disposed with their axes L of rotation extending in the lateral direction D2.

The body structures 4 of the painting robots 1 are at a level higher than the workpiece 2 being conveyed in the painting booth. The painting robots 1 spray the paint on the upper and side surfaces of the workpiece 2 being conveyed in the painting booth to coat the surfaces with the film.

The foregoing painting robot 1 embodying the present invention specifically described herein is only an example and various changes and variations are possible therein without departing from the scope of the present invention. For example, the workpiece 2 may be conveyed in a tact time mode instead of conveying continuously; that is, the workpiece 2 may be conveyed intermittently and may be stopped temporarily at one or several positions on the workpiece conveying path.

Although the painting robot 1 provided with the spray gun 9 as an end effector has been described by way of example, the present invention may be embodied in a welding robot provided with a welding gun as an end effector.

The kinds of the elongate members 17 are dependent on the types of end effectors. The elongate members 17 may include a cooling water supply hose for supplying cooling water to the end effector.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A robot for carrying out a predetermined work, comprising:
   a body structure;
   a robot arm rotatably supported on the body structure, the robot arm having a front end part; and
   an end effector supported on the front end part of the robot arm,
   wherein the body structure has a stationary base unit including a mounting face which enables the stationary base unit to be fixedly installed at a predetermined position and a movable unit rotatably supported on the stationary base unit so as to turn about an axis of rotation relative to the stationary base unit,
   wherein the stationary base unit includes a stationary-side guide part having a stationary-side internal space in which a flexible, elongate member connected to the robot arm or the end effector is extended loosely along the axis of rotation, the stationary-side guide part opening upstream in a direction in which the elongate member is inserted into the stationary base unit, so as to open at a surface of the stationary-side guide part which is lateral to the mounting face,
   wherein the movable unit includes a movable-side guide part having a movable-side internal space in which the elongate member is extended loosely along the axis of rotation, the movable-side guide part opening downstream in a direction in which the elongate member is inserted into the movable unit, and
   wherein the stationary-side internal space and the movable-side internal space communicate with each other.

2. The robot according to claim 1, wherein the stationary base unit is fixedly mounted on a base having a substantially horizontal mounting surface on which the stationary base unit is placed.

3. The robot according to claim 1, further comprising rotative driving means for driving the movable unit so as to turn about the axis of rotation relative to the stationary base unit, the rotative driving means being fixedly mounted on the stationary base unit.

4. The robot according to claim 1, wherein the body structure is provided with a cylindrical auxiliary guide member fixed to the movable unit so as to extend into the stationary-side internal space of the stationary base unit, the auxiliary guide member defining an auxiliary internal space through which the elongate member is extended loosely along the axis of rotation, the auxiliary internal space communicating with the movable-side internal space of the movable unit.

5. The robot according to claim 4, wherein the body structure is provided with a contact member disposed at an upstream opening of the stationary-side guide part, the contact member having an inner peripheral part protruding radially inward beyond an edge of the upstream opening of the auxiliary guide member so as to contact with the elongate member.

6. The robot according to claim 5, wherein the contact member has an annular shape extending along the upstream opening of the stationary-side guide part.

7. The robot according to claim 1, wherein the end effector is a spray gun, the elongate member including a paint supply hose for supplying paint to the spray gun, and the predetermined work being a painting work for painting a workpiece.

8. The robot according to claim 1, wherein the mounting face is parallel with the axis of rotation of the movable unit.

9. The robot according to claim 1, wherein the surface of the stationary-side guide part which is open upstream in a direction in which the elongate member is inserted is perpendicular to the mounting face.

* * * * *